United States Patent [19]

Tregay et al.

[11] 3,924,061

[45] Dec. 2, 1975

[54] FACSIMILE TRANSCEIVER UTILIZING SINGLE LIGHT SOURCE

[75] Inventors: John L. Tregay, Weston, Conn.; Paul Z. Boros, New York, N.Y.

[73] Assignee: Comfax Communications, Inc., New York, N.Y.

[22] Filed: June 11, 1974

[21] Appl. No.: 478,259

[52] U.S. Cl. ........... 178/6; 178/DIG. 27; 178/6.6 R; 178/7.88; 178/7.6

[51] Int. Cl.$^2$ ....................... H04N 1/22; H04N 1/42

[58] Field of Search ............ 178/7.6, DIG. 27, 7.88, 178/6.6 R, 6, 6.6 A, 6.7 R

[56] References Cited

UNITED STATES PATENTS

| | | | |
|---|---|---|---|
| 3,155,022 | 11/1964 | Schwertz | 178/6.6 A |
| 3,614,313 | 10/1971 | Alden | 178/DIG. 27 |
| 3,784,741 | 1/1974 | Minami | 178/7.88 |
| 3,845,239 | 10/1974 | Granzow | 178/7.6 |

*Primary Examiner*—Howard W. Britton
*Attorney, Agent, or Firm*—Hopgood, Calimafde, Kalil, Blaustein & Leiberman

[57] ABSTRACT

A facsimile transmitter and receiver, or transceiver, is disclosed in which a common scanning light source is employed to scan the information-containing document in the transmission mode and to scan the print paper in the reception mode.

24 Claims, 5 Drawing Figures

FACSIMILE TRANSCEIVER UTILIZING SINGLE LIGHT SOURCE

The present invention relates generally to information transmission systems, and more particularly to an improved facsimile transceiver employing a single scanning light source.

In a conventional facsimile transceiver, the transmission of data is performed by scanning a light beam over a datacontaining document and converting the light reflected from the scanned portions of the document into a series of corresponding electrical signals. Those signals are transmitted, typically over a conventional telephone line, to a remote facsimile transceiver where those signals are processed to reproduce the information on a suitable print medium. The light beam, which is conventionally produced by a cathode ray tube, is caused to scan in one direction across the document and the document is incrementally moved along a path that is perpendicular to the direction of the scanning beam so that the entire document is scanned. To achieve an optimum overall scanning rate while still maintaining good data resolution, a variable velocity scanning technique, such as that described in U.S. Pat. No. 3,646,248, may be employed to cause the light beam to be scanned relatively slowly over portions of the document that contain data and relatively quickly over background portions of the document that contain no meaningful data.

Several electronic and mechanical techniques are in common use in the known facsimile receivers for the purpose of processing data information received from a remote transmitter to produce an image on a print paper that corresponds to those data signals. These techniques include the use of a mechanical stylus that operates in response to the received data signals to print the desired pattern on specially prepared paper. In another printing technique used in known facsimile transceivers, the print paper contains overlying black and white layers. Portions of the black layer are selectively burned or etched away by the use of a stylus that operates in accordance with the received data signals to leave the desired pattern on the print paper. Other known facsimile transceivers employ a separate light source, such as a second cathode ray tube as shown, for example, in the receiver portion of the transceiver described in the aforesaid patent. The light beam produced by the additional receiver cathode ray tube is modulated in accordance with the received data signals and is scanned over a suitably treated paper to form a pattern of charged locations on the paper. The paper is subsequently processed to produce an image corresponding to the locations of the charged areas and thus to the received data signals, as desired.

The need for additional mechanical and electrolytic components or an additional cathode ray tube and associated control circuitry in the data receiving section of the known facsimile transceivers greatly increases the size, complexity, and cost of those transceivers, particularly those transceivers that employ variable-velocity scanning techniques. Moreover, the known transceivers generally require separate elements, such as two stepping motors and associated linkages, to advance the document being scanned during transmission and to advance the print paper during reception. This need for the duplication of driving elements further adds to the size, cost, and complexity of the known facsimile transceivers and also tends to increase the likelihood of mechanical failure with the resulting equipment down periods required for repair. Other drawbacks in the known facsimile transceivers result from the use of relatively complex and often inaccurate and unreliable devices, such as photosensors or micro-switches, to detect the proper registration of the document or print paper with respect to the scanning and printing beams.

It is, therefore, an object of the invention to provide a facsimile transceiver or the like in which a single line scanning light source is employed for transmitting and receiving.

It is a further object of the invention to provide a facsimile transceiver in which a single driving element is employed to move the document and print paper during the transmission and reception modes, respectively.

It is a more general object of the invention to provide a more reliable, less complex, and less costly facsimile transceiver than that heretofore available.

The facsimile transceiver of the invention employs a single scanning light source for transmitting and receiving. In the transmission mode, the document, which may be a letter, memorandum, chart, photograph, or the like containing pictorial or alphanumeric information to be transmitted to a remote receiver, is caused to be moved along a path spaced from the light source that produces the beam that is scanned over the document. The print paper, on which information received from a remote transmitter is reproduced, is moved along a second path substantially parallel and spaced from the path along which the document is moved and in substantial intimate contact with the light source. The light beam produced by the light source is directed onto the transmitted document during the transmission mode and, in a modulated form, is scanned over the print paper during the reception mode. The single light source thus serves in both the transmission and reception modes of transceiver operation.

In accordance with a further aspect of the invention, means are provided to maintain the print paper against the light source during the reception mode while permitting the substantially uninterrupted passage of the scanning beam from the light source to the document during the transmission mode.

In the embodiment of the invention herein specifically disclosed, that means is in the form of a paper guide having a transparent section, such as an opening, to permit light from the source to pass uninterruptedly to the document during the transmission mode, this is, when the document is in position for scanning and no print paper is in position to be scanned.

In another aspect of the invention, the face plate of the single light source includes a fiber optics section through which the scanning beam is directed onto the print paper during the reception mode, and a transparent section through which the scanning beam is passed onto the document during the transmission mode. In yet a further aspect of the invention, a registration mirror is positioned along the axis of the scanning beam and operates in combination with a sensing circuit to provide a reliable indication of the proper placement or registration of the document and print paper during the transmission and reception modes, respectively, and to provide appropriate synchronizing signals for the receiver and transmitter. This arrangement is also used to provide a indication of the end of transmission and reception.

To the accomplishment of the above and to such further objects as may hereinafter appear, the present invention relates to a facsimile transceiver utilizing a single light source substantially as defined in the appended claims and as described in the following specification taken together with the accompanying drawings, in which:

Figure 1:
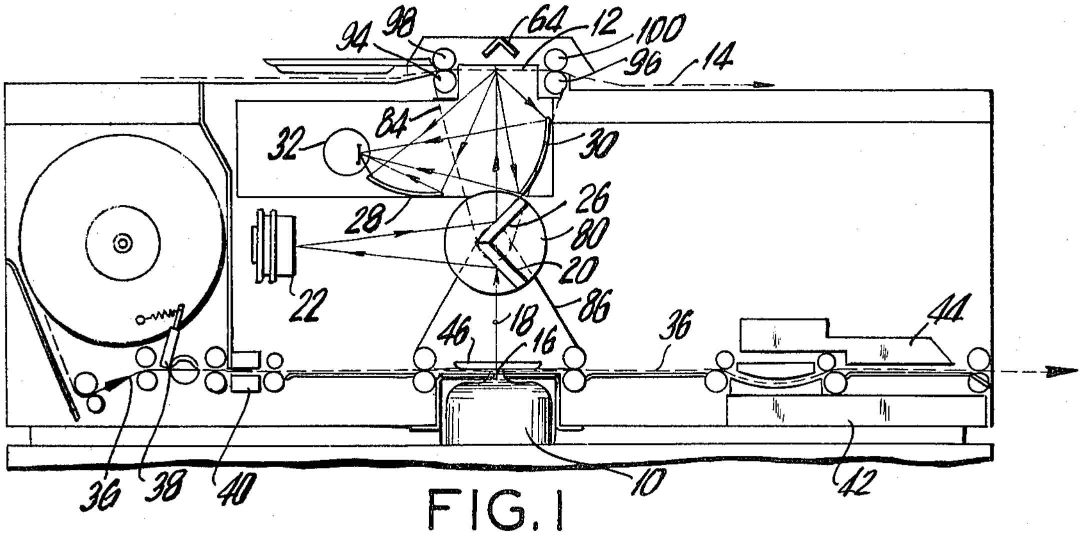
FIG. 1 is a schematic view in plane of an embodiment of a fascimile transceiver according to the present invention.

FIG. 1 schematically illustrates a facsimile transceiver in which a single light source, here shown as a cathode ray tube 10, is employed in both the receiving and transmitting modes of the transceiver. During transmission, a document 12 is moved in the direction of the arrow along a longitudinal path, indicated by the broken-line 14, which is spaced from the front surface 16 of cathode ray tube 10. When the document is in position for transmission, its surface is scanned by a light scanning beam 18 produced in a known manner by the cathode ray tube. In the embodiment shown, the scanning light beam is initially reflected from a mirror 20 to an optical lens mirror assembly 22 where the beam is focused and re-reflected onto the surface of the mirror 26 which, as shown, is substantially perpendicular to mirror 20. The scanning beam is then reflected from mirror 26 onto the surface of the document.

The scanning light beam is moved in a direction normal to the plane of the drawing and is reflected in accordance with the reflectance of the portion of the document then being scanned onto a pair of curved mirrors 28 and 30 which collect and redirect the light in a focused beam to a photo sensor, here shown as a photomultiplier assembly 32. Although not shown in the drawings, photomultiplier assembly 32 preferably includes a pair of photomultiplier tubes spaced along the path of the scanning beam, and curved mirrors 28 and 30 extend along the length of the path traversed by the scanning beam.

At the completion of scanning of one line of the document, the document is incrementally moved along path 14 by a predetermined amount and the scanning of the beam is repeated until the entire document is scanned, after which the document is removed from the scanning location. As noted previously, the velocity of the scanning beam may be controlled in accordance with the content of the document being scanned, so that the beam is scanned relatively slowly over dark, information regions of the document and more rapidly over white, background regions of the document. One way of achieving such variable velocity scanning is described in U.S. Pat. No. 3,646,248.

The reflected light received by the photomultiplier assembly is converted in a known manner to an analog electrical signal that corresponds to the information content on the document. That electrical signal may be processed in a known manner to develop a binary signal that is transmitted over a telephone line or similar link to a remote facsimile transceiver.

In the reception mode of operation of the facsimile transceiver, specially treated print paper, such as zincoxide coated paper, is taken from a roll 34 and moved along a path 36 past a cutter 38 where an appropriate length of print paper is cut. That length of print paper is passed through a charger 40 where an electrical charge is placed on the paper and the print paper is passed along the face 16 of the cathode ray tube where it is scanned by a light beam produced by the same cathode ray tube used in transmission. In the reception mode, however, the beam produced by the cathode ray tube is modulated (e.g. turned on and off in a digital system) in response to the received data signals.

The modulated beam is scanned over the print paper, which is incrementally moved along path 36, so that the complete surface of the print paper is scanned by the modulated beam to produce selectively discharged areas on the print paper at those locations on which the light beam is incident. After the print paper is scanned in this manner, it is passed into a print developer 42 where the paper is treated by a toner or the like to form an image that corresponds to the pattern of the discharged areas on the paper. From the developer, the paper, now containing an image corresponding to the received data signals, is passed to a print dryer 44 where the paper is dried and then to a tray or receptacle (not shown).

From the foregoing description of the facsimile transceiver, it will be appreciated that a single scanning light source, namely, the cathode ray tube, is used in both data transmission and data reception. To achieve optimum clarity and resolution of the image formed, the print paper is preferably maintained in contact with the face of the cathode ray tube while the paper is being scanned by the modulated scanning beam. To this end, as shown in FIG. 1 and in greater detail in FIG. 2, means, here shown in the form of a transparent guide 46, are provided to hold the print paper against the face of the cathode ray tube during the reception mode while permitting unimpeded transmission of the scanning beam to the document during the transmission mode.

Figure 2:
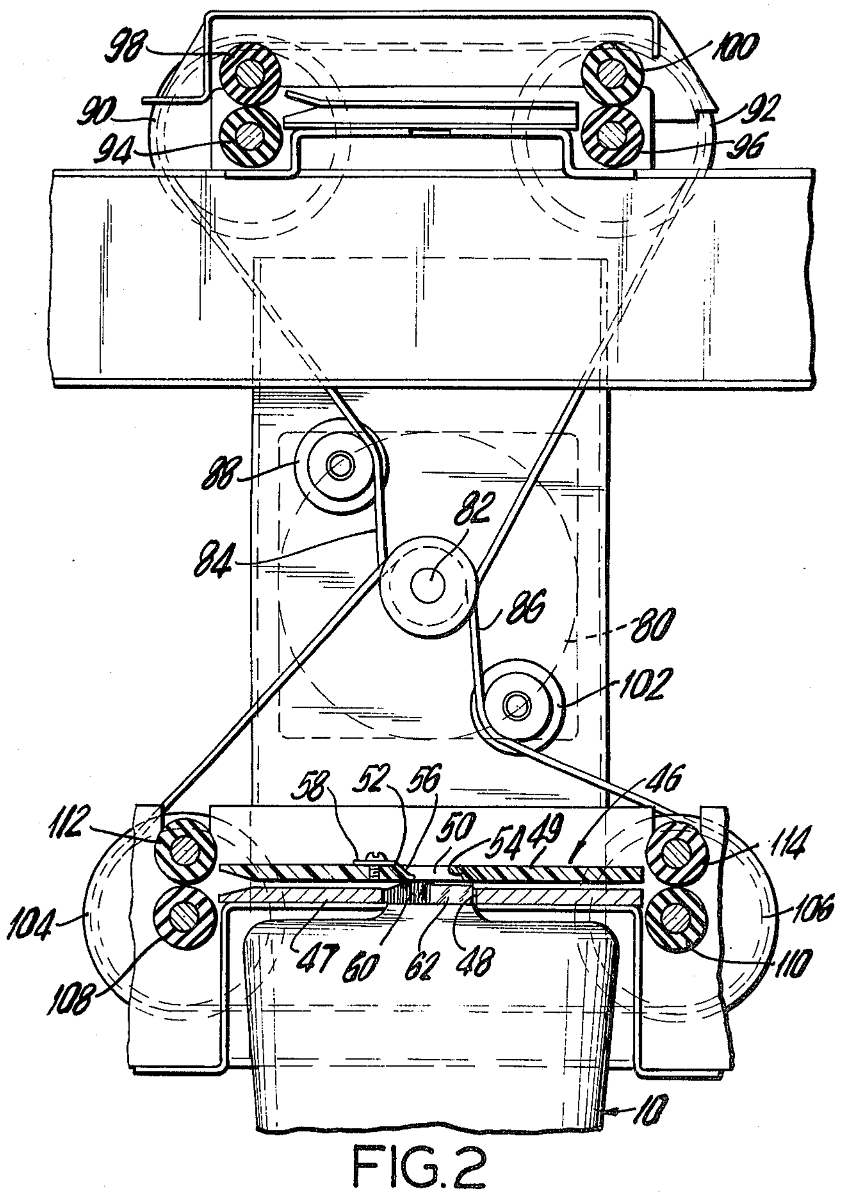
FIG. 2 is a more detailed plan view, on an enlarged scale as compared to FIG. 1, and partly in cross-section, illustrating certain components of the facsimile transceiver of FIG. 1.
Figure 4:
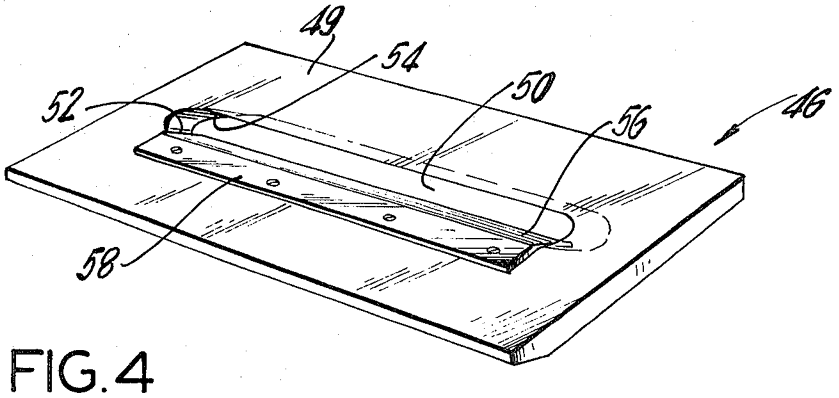
FIG. 4 is a perspective view of an embodiment of the print paper guide as employed in the facsimile transceiver of FIG. 1.

In the embodiment shown in FIGS. 2 and 4, guide 46 is in the form of a rectangular block 49 which may be made, for example, of a transparent plastic material. Guide 46, as shown in FIG. 2, has an upwardly flared inward end which, together with a correspondingly formed inward end of a plate 47, forms a tapered throat which receives the leading edge of the print paper from the charger. Plate 47 has a central rectangular opening 48 which fits over the face of the cathode ray tube.

The print paper is moved incrementally between guide 46 and plate 47 to a position over opening 48 at which time scanning of the beam over the print paper is initiated. As shown in FIG. 4, guide 46 has an elongated opening 50 formed therein and is in substantial registration with opening 48 in plate 47. The upper and lower walls 52 and 54 of opening 50 are beveled or sloped downwardly in the direction of movement of the print paper across the face of the cathode ray tube. In addition, a flexible sheet 56 secured to block 49 by means of a metal plate 58 extends over and past the lower end of wall 52.

When the print paper is moved over the cathode ray tube (from left to right as viewed in FIG. 2), flexible sheet 56 presses the print paper against the face of the tube. Should there be a curl or bend in the leading edge of the paper, the sloped wall 54 acts as a camming surface that will urge the leading edge of the paper downward, thereby avoiding any obstruction in the movement of the print paper over the face of the tube during the reception mode.

Figure 3:
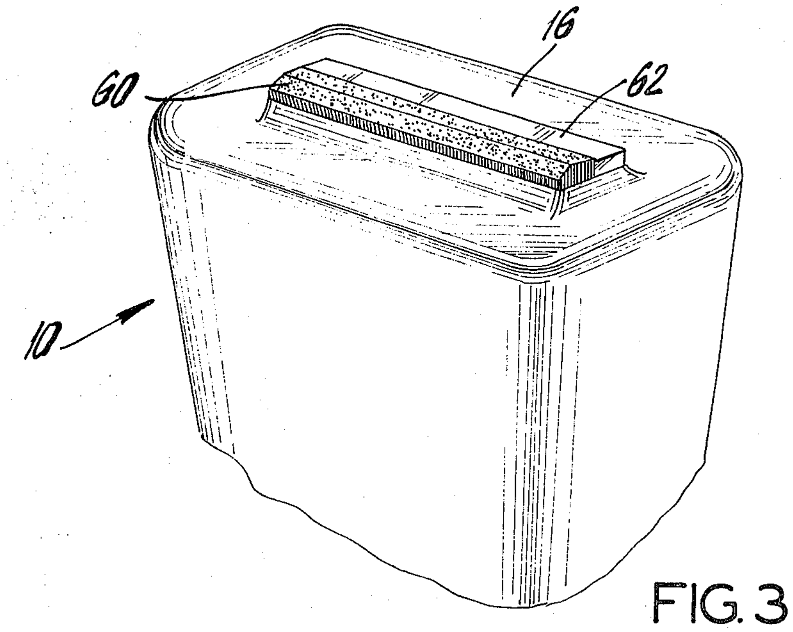
FIG. 3 is a perspective view of the cathode ray tube as employed in the facsimile transceiver of FIG. 1.

In another aspect of the invention, the face plate of the cathode ray tube, as shown best in FIG. 3, includes an elongated fiber optics section 60 and an adjoining elongated clear glass section 62, both of which extend along the path of the scanning light beam produced by the cathode ray tube. Fiber optics section 60 includes a multiplicity of closely spaced light conducting optical fibers in which the light transmitting axes are substantially aligned with the axis of the scanning beam.

During the reception mode of the transceiver of the invention, a modulated scanning beam is produced on the cathode ray tube face at a location underlying fiber optics section 60, whereas during the transmission mode the location of the unmodulated scanning beam is shifted to scan along the portion of the tube face that underlies clear glass section 62. The shifting of the scanning beam path between the positions for transmission and reception is achieved in a known manner by applying suitable voltages to the deflection circuitry of the cathode ray tube. The circuitry for accomplishing the shifting of the beam is well known to those skilled in the art and is not further disclosed herein. The optical fibers in the fiber optics section 60, through which the scanning beam passes during the reception mode, transmit the illuminated spot produced on the face of the cathode ray tube from inside the tube onto the surface of the print paper without a loss of resolution that would occur if the light beam were transmitted through plain glass.

During the transmission mode, during which maximum intensity of the scanning beam is desired, the scanned beam is directed through and along the clear glass section 62 which introduces no significant loss in beam intensity. The optical assembly 22 (FIG. 1) is adjusted to focus directly on the cathode ray phosphor through the clear glass section 62 so as to direct the scanning beam onto the face of the document.

In a further aspect of the invention, which further facilitates the use of a single scanning light source for both facsimile transmission and reception, a registration mirror 64 (FIG. 1) is positioned along the central axis of the scanning beam to the rear of the transmission document path. Mirror 64, which may, as shown, be in the form of a pair of perpendicularly arranged reflecting surfaces, is positioned to reflect, when no document is in position for scanning, a maximum amount of the scanning light beam onto the photo sensor 32. As the document is moved in position for scanning and transmission, the leading edge of the document passes between the beam and registration mirror and reflects a reduced amount of light onto the photo sensor, since even the most highly reflective portions of the document are substantially less reflective than the surface of the registration mirror.

Figure 5:
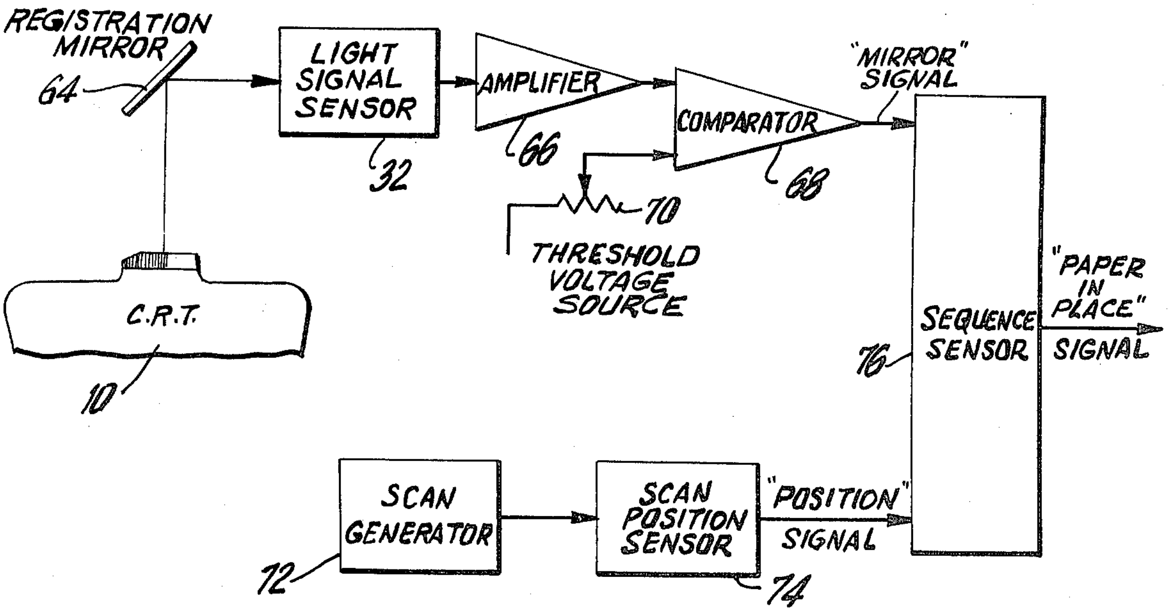
FIG. 5 is a schematic block diagram of the document registration indicator circuitry of the facsimile transceiver.

The relative reflectances of the document and registration mirror are utilized in the circuit schematically illustrated in FIG. 5, to produce an indication that the leading edge of the document is in place for scanning. To this end, the electrical signal produced by the photo sensor 32, which corresponds to the intensity of the light reflected to the sensor by either the registration mirror or document, is applied to an amplifier 66, the output of which is applied to one input of a level comparator 68.

The other input to the comparator is derived from a variable threshold voltage source 70 indicated by the variable resistance. The reference threshold voltage obtained from the threshold source 70 is below the output of amplifier 66 when no document is in place for scanning and greater than that obtained when the document is in place to intercept light from the registration mirror.

Comparator 68 in a known manner produces a "mirror" signal at one of two discrete levels corresponding to whether or not the output of the photo sensor 32 is above or below the reference signal from source 70, and thus indicates whether or not a document is in place for scanning.

A scan generator 72 produces a scanning signal that is applied to the cathode ray tube to cause the light spot produced by the tube to scan over the document. That scan signal is also applied, as shown in FIG. 5, to a scan position sensor 74, which produce a binary position signal that corresponds to the instantaneous position of the scanning spot along the path of the scanning beam.

The "mirror" signal and scan signal are both applied to a sequence sensor logic circuit 76, which processes the two input signals to produce a "paper-in-place" signal when the two inputs indicate that the document is in place and the scanning beam is at the beginning of a scanning line. The paper in place signal, when produced in this manner, is processed and employed to produce a synchronizing signal that is transmitted to the remote receiver to synchronize the scanning beam at the receiver with the scanning beam at the transmitter. The actual logic circuit design of scan position sensor 74 and sequence sensor 76 are within the skill of the art and in themselves play no part of the present invention. Those circuit designs are thus not further described herein.

At the termination of transmission, when the trailing edge of the document moves past the scanning beam, the beam once again is directly incident on and reflected from the registration mirror, thereby to produce a sudden increase in the output of the photo sensor that causes a corresponding increase in the output of amplifier 66. This in turn changes the output of comparator 68 to produce a signal indicating the end of transmission.

The registration mirror and indicating circuitry shown in FIG. 5 are also used to advantage in the reception mode of the facsimile transceiver of the invention. Prior to the reception of a signal from the remote facsimile transmitter that a document is in place at the remote transmitter for scanning, no print paper (or document) is located to interrupt the scanning beam from the registration mirror, and a maximum quantity of light is thus reflected from the registration mirror onto the photo sensor. In response to a reception command received from the remote transmitter, a charged print paper is fed into place for printing. When the leading edge of the print paper intercepts the scanning beam, substantially no light is reflected onto the photo sensor and, as described previously, the output of sensor 32 is substantially reduced and a "paper-in-place" signal is produced by sensor 76. That signal is employed to reduce the rate of feed of the print paper and is transmitted to the transceiver to provide an indication there that the print paper is in place for scanning and reception. At this time the scanning beam is modulated by the received scanning beam and the thus modulated beam is scanned over the print paper which is incrementally moved past the scanning beam as described previously.

The movement of both the transmission document and the print paper past the scanning beam produced by the single cathode ray tube are controlled by a single stepping motor 80 positioned, as shown in FIG. 1, intermediate the paths of movement of the document and the print paper. Motor 80 drives a shaft 82 (FIG. 3) which carries a document drive belt 84 and a print paper drive belt 86. Belt 84 passes over an idler roller 88 and over wheels 90 and 92, which respectively carry feed rollers 94 and 96. Rollers 94 and 96 are in turn respectively in close contact with rollers 98 and 100 to cause the latter to rotate upon the rotation of wheels 90 and 92 and rollers 94 and 96.

Similarly, belt 86 passes over an idler roller 102 and wheels 104 and 106, which respectively carry feed rollers 108 and 110. Rollers 108 and 110 are respectively in contact with rollers 112 and 114 and cause the latter to rotate upon the rotation of wheels 104, 106 and feed rollers 108 and 110.

During the transmission mode of the transceiver, motor 80 is caused to operate at a relatively high speed. The document to be scanned is passed between rollers 94 and 98 which rotate along with the motor shaft to bring the leading edge of the document in line with the scanning beam. At this time, as described previously, the motor and feed rollers cause the document to be incrementally moved along the document path at a rate determined by the data content of the document. The document moves along that path and the leading edge of the document is subsequently captured between the rollers 96 and 100, which then proceed to incrementally move the document through and then past the scanning beam. Once the document no longer intercepts the beam, so that the beam is again incident on the registration mirror, the motor speed is increased to the fast or slew rate and the document is passed into a tray. The incremental feeding of the print paper over the face of the cathode ray tube during the reception mode is accomplished in a similar manner by the operation of motor 80 and rollers 108, 112, 110 and 114.

It will thus be appreciated from the foregoing description that the facsimile transceiver of the invention operates in a reliable manner to both transmit and receive data with the use of a common scanning beam source. In addition, the control and feeding of the document and print paper during the transmission and reception modes, respectively, are both reliably achieved by a common control system utilizing a common mirror and a feed system utilizing a common drive motor. The facsimile transceiver of the invention is thus significantly less complex and thus, less costly and less bulky as compared to the presently known facsimile transceivers and still achieves reliable and effective, high-speed and high resolution facsimile transmission and reception.

Although the facsimile transceiver of the invention has been herein specifically described with respect to a presently preferred embodiment thereof, certain modifications thereto will be apparent to those skilled in the art. For example, the source of the scanning beam here shown as a cathode ray tube may be replaced by an array of light-emitting diodes or any other suitable source of a controllable scanning spot or beam of light. In addition, the guide employed to maintain the print paper against the face of the cathode ray tube during the reception mode while permitting the scanning beam to be directed on the transmitted document during the transmission mode, may be a transparent block without an elongated opening, or a translucent or opaque member having such an opening to permit the scanning beam to pass therethrough. The guide could, if desired, be moved away from the scanning beam path during the transmission mode and could thus be either transparent or opaque. Moreover, the single motor used to advance and feed the print paper and document past the scanning beam could be a servo motor or synchronous motor, rather than the stepping motor herein specifically described.

Thus, whereas only a single embodiment of the invention has been specifically described, it will be apparent that modifications may be made therein all without departing from the spirit and scope of the invention.

What is claimed is:

1. A facsimile transceiver capable of operating in a transmission mode in which information contained on a document or the like is transmitted to a remote receiver, and a reception mode in which information received from a remote transmitter is reproduced on a print paper, said transceiver comprising a source of a scanning beam directed along a scan axis, means for moving during said transmission mode the document along a first path substantially perpendicular to said axis and remote from said source to a scanning location at which said scanning beam is incident on the surface of said document, and for moving during the reception mode the print paper along a second path spaced along said axis from said first path, and substantially perpendicular to said axis, and into substantial contact with said beam source, and means positioned intermediate said first and second paths for directing said beam onto the document at said scanning location during said transmission mode, whereby said scanning beam is caused to scan over the document during said transmission mode and over the print paper during said reception mode.

2. The transceiver of claim 1, in which said document and print paper moving means comprises a single motor positioned intermediate said first and second paths, and first and second drive means operatively mechanically coupled to said single motor for respectively moving the document and print paper along said first and second paths.

3. The transceiver of claim 1, further comprising guide means for urging the print paper into contact with said source during said reception mode and for permitting said scanning beam to be uninterruptedly directed toward the document scanning location during said transmission mode.

4. The transceiver of claim 3, in which said guide means includes a member having a light passing portion in registration with said source, said member being positioned along said second path immediately adjacent the surface of said source.

5. The transceiver of claim 4, in which said guide means includes a rigid member engaging the print paper when the latter is moved to a position intermediate said member and the face of said source, said light passing portion being in the form of an elongated opening formed in said member and extending in a direction substantially perpendicular to said second path and having an axial length in said direction of substantially the extent of travel of said scanning beam.

6. The transceiver of claim 5, in which said guide member includes a sloping surface formed along one wall defining said elongated opening for contacting and urging the leading edge of the print paper toward the face of said source.

7. The transceiver of claim 6, in which said guide member further includes a resilient member extending over the other wall surface defining said opening for urging the print paper toward the surface of said source.

8. The transceiver of claim 1, in which said light source comprises a cathode ray tube including on the face thereof an elongated section for passing said scanning beam onto the print paper during said reception mode, and a second section substantially parallel to and adjacent said first section for passing said scanning beam onto the document during said transmission mode.

9. The transceiver of claim 8, in which said first section includes a multiplicity of optical fibers for directing said scanning beam in a direction substantially normal to the face of said source.

10. The transceiver of claim 9, in which said second section comprises a transparent medium extending along the direction of scanning of said scanning beam.

11. The transceiver of claim 1, further comprising reflecting means positioned to the rear of said first path and in alignment with said scanning beam, and light responsive means for receiving light reflected from said reflecting means when neither the document nor the print paper interrupts said scanning beam from being incident on said reflecting means.

12. The transceiver of claim 1, further comprising means for comparing the intensity of light reflected from said reflecting means to said light responsive means and light incident on said light responsive means when one of the document and print paper intercepts said scanning beam, and means operatively connected to said comparing means for producing a signal indicating the interruption of said beam by the document and print paper, thereby indicating when one of the document or print paper is in location for transmission or reception, respectively.

13. The transceiver of claim 11, in which said document and print paper moving means comprises a single motor positioned intermediate said first and second paths, and first and second drive means operatively mechanically coupled to said single motor for respectively moving the document and print paper along said first and second paths.

14. The transceiver of claim 1, further comprising guide means for urging the print paper into contact with said source during said reception mode and for permitting said scanning beam to be uninterruptedly directed toward the document scanning location during said transmission mode.

15. The transceiver of claim 14, in which said document and print paper moving means comprises a single motor positioned intermediate said first and second paths, and first and second drive means operatively mechanically coupled to said single motor for respectively moving the document and print paper along said first and second paths.

16. The transceiver of claim 14, further comprising reflecting means positioned to the rear of said first path and in alignment with said scanning beam, and light responsive means for receiving light reflected from said reflecting means when neither the document nor the print paper interrupts said scanning beam from being incident on said reflecting means.

17. The transceiver of claim 16, further comprising means for comparing the intensity of light reflected from said reflecting means to said light responsive means and light incident on said light responsive means when one of the document and print paper intercepts said scanning beam, and means operatively connected to said comparing means for producing a signal indicating the interruption of said beam by the document and print paper, thereby indicating when one of the document or print paper is in location for transmission or reception, respectively.

18. The transceiver of claim 14, in which said light source comprises a cathode ray tube including on the face thereof an elongated section for passing said scanning beam onto the print paper during said reception mode, and a second section substantially parallel to and adjacent said first section for passing said scanning beam onto the document during said transmission mode.

19. The transceiver of claim 18, which said first section includes a multiplicity of optical fibers for directing said scanning beam in a direction substantially normal to the face of said source.

20. The transceiver of claim 19, in which said second section comprises a transparent medium extending along the direction of scanning of said scanning beam.

21. The transceiver of claim 14, in which said guide means includes a member having a light passing portion in registration with said source, said member being positioned along said second path immediately adjacent the surface of said source.

22. The transceiver of claim 21, in which said guide means includes a rigid member engaging the print paper when the lattr is moved to a position intermediate said member and the face of said source, said light passing portion being in the form of an elongated opening formed in said member and extending in a direction substantially perpendicular to said second path and having an axial length in said direction of substantially the extent of travel of said scanning beam.

23. The transceiver of claim 22, in which said guide member includes a sloping surface formed along one wall defining said elongated opening for contacting and urging the leading end of the print paper toward the face of said source.

24. The transceiver of claim 23, in which said guide member further includes a resilient member extending over the other wall surface defining said opening for urging the print paper toward the surface of said source.

* * * * *